United States Patent
Regensburger et al.

(10) Patent No.: US 12,066,613 B2
(45) Date of Patent: Aug. 20, 2024

(54) OPTICAL IMAGING DEVICE AND METHOD FOR IMPROVING DISPLAYED IMAGES

(71) Applicant: Carl Zeiss Meditec AG, Jena (DE)

(72) Inventors: Alois Regensburger, Poxdorf (DE); Christoph Hauger, Aalen (DE); Susanne Kohlhammer, Blaustein (DE)

(73) Assignee: Carl Zeiss Meditec AG, Jena (DE)

( * ) Notice: Subject to any disclaimer, the term of this patent is extended or adjusted under 35 U.S.C. 154(b) by 509 days.

(21) Appl. No.: 16/925,253

(22) Filed: Jul. 9, 2020

(65) Prior Publication Data
US 2021/0011265 A1    Jan. 14, 2021

(30) Foreign Application Priority Data
Jul. 9, 2019   (DE) ............. 10 2019 118 508.4

(51) Int. Cl.
*G02B 21/00*   (2006.01)
*G02B 21/22*   (2006.01)
(Continued)

(52) U.S. Cl.
CPC ......... *G02B 21/0012* (2013.01); *G02B 21/22* (2013.01); *G02B 21/361* (2013.01); *G06T 5/50* (2013.01); *G06T 2207/10056* (2013.01)

(58) Field of Classification Search
CPC .................. G02B 21/00; G02B 21/0004; G02B 21/0008; G02B 21/0012; G02B 21/0016;
(Continued)

(56) References Cited

U.S. PATENT DOCUMENTS 7,751,120 B2   7/2010 Zimmer et al.
9,138,135 B2 * 9/2015 Oderwald .......... A61B 1/00183
(Continued)

FOREIGN PATENT DOCUMENTS

DE   102006036300 B4   11/2007
DE   102012106584 A1    1/2014
(Continued)

OTHER PUBLICATIONS

Office Action issued in German Patent Application No. DE 10 2019 118 508.4 (from which this application claims priority), dated Feb. 27, 2020 and English language machine translation thereof.
(Continued)

*Primary Examiner* — Thong Q Nguyen
(74) *Attorney, Agent, or Firm* — Ewers IP Law PLLC; Falk Ewers

(57) ABSTRACT

An optical imaging device includes at least a first and a second image recording units for generating a first and a second original images of an object, wherein the original images differ at least with regard to an image parameter, wherein the image recording units are arranged such that original images are recorded from the same perspective, an image processing unit configured to further process the original images and an image display unit configured to reproduce displayed images generated from the processed original images. The image processing unit is configured to supplement at least one of the two original images with image information from the other original image to generate a displayed image. In addition, a corresponding method is provided.

23 Claims, 4 Drawing Sheets

(51) Int. Cl.
  *G02B 21/36* (2006.01)
  *G06T 5/50* (2006.01)
(58) Field of Classification Search
  CPC ............ G02B 21/0028; G02B 21/0032; G02B 21/0052; G02B 21/0056; G02B 21/006; G02B 21/0072; G02B 21/0076; G02B 21/008; G02B 21/14; G02B 21/20; G02B 21/22; G02B 21/24; G02B 21/241; G02B 21/244; G02B 21/245; G02B 21/247; G02B 21/361; G02B 21/365
  USPC .................................................. 359/368–398
  See application file for complete search history.

(56) References Cited

U.S. PATENT DOCUMENTS

| | | | |
|---|---|---|---|
| 9,241,627 B2 * | 1/2016 | Steinmueller | A61B 3/102 |
| 9,516,242 B2 | 12/2016 | Kerwien et al. | |
| 10,247,910 B1 * | 4/2019 | Putman | G02B 21/244 |
| 10,324,281 B2 | 6/2019 | Wilzbach et al. | |
| 10,437,037 B2 | 10/2019 | Kiening et al. | |
| 11,079,587 B2 * | 8/2021 | Regensburger | G02B 21/365 |
| 2012/0105612 A1 | 5/2012 | Yoshino | |
| 2015/0297311 A1 | 10/2015 | Tesar | |
| 2017/0115477 A1 * | 4/2017 | Kiening | G02B 21/368 |
| 2018/0303574 A1 | 10/2018 | Ramirez Luna et al. | |

FOREIGN PATENT DOCUMENTS

| | | |
|---|---|---|
| DE | 102014210053 A1 | 12/2015 |
| DE | 102015118154 A1 | 4/2017 |
| JP | 2008076257 A | 4/2008 |
| JP | 2012095828 A | 5/2012 |
| JP | 2018-518859 * | 7/2018 |

OTHER PUBLICATIONS

Office Action dated May 7, 2024, issued in Japanese counterpart application No. 2020-100440 and English-language Office Action Summary thereof.

* cited by examiner

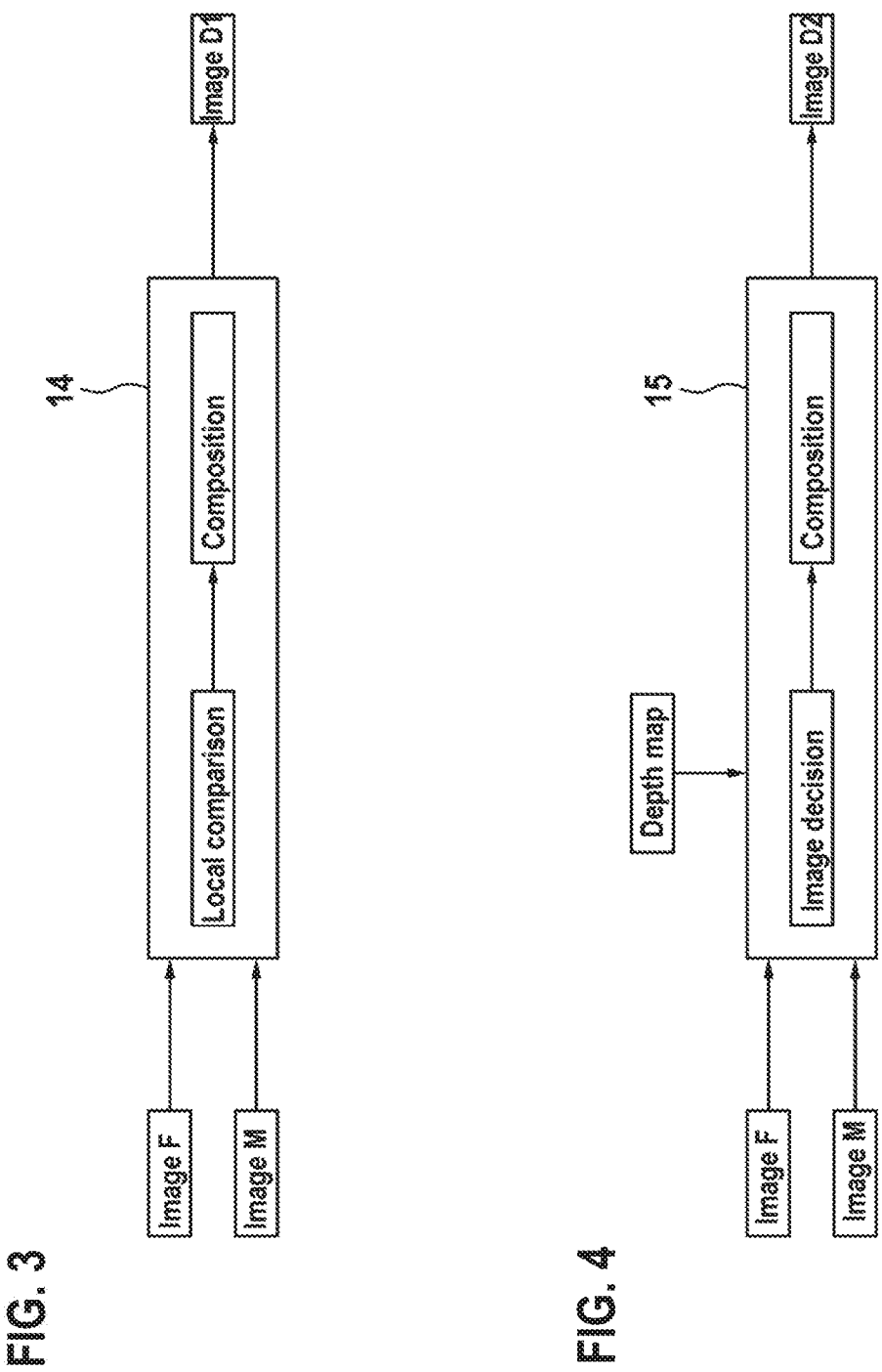

OPTICAL IMAGING DEVICE AND METHOD FOR IMPROVING DISPLAYED IMAGES

CROSS REFERENCE TO RELATED APPLICATIONS

This application claims priority to German patent application DE 10 2019 118 508.4, filed Jul. 9, 2019, the entire content of which is incorporated herein by reference.

TECHNICAL FIELD

The disclosure relates to an optical imaging device, in particular a digital surgical microscope, having at least two image recording units per observation perspective, and to a method for generating images for an observer. Digital surgical microscopes serve to ensure an improved spatial display of the chosen optical region for the observer, e.g., specialist medical personnel. In particular, the adaptation of optical parameters such as optical magnification, object resolution and also a specific depth of field is desired.

BACKGROUND

On account of the digital processing processes, digital surgical microscopes have the advantage that the images obtained, with respect to optical parameters, can be digitally post-processed and thus improved. However, the optical arrangement present imposes technical limits; in this regard, for a simple optical system of a camera, for example, a high depth of field is linked with a low object resolution.

One possible approach for combatting this problem is described in the German Patent Application Publication DE 10 2006 036 300 B4. The latter discloses a stereo microscope having a respective beam path for an eye of the observer, wherein the optically effective diameter of an optical element in a first beam path is embodied so as to deviate from the optically effective diameter of an optical element in a second beam path. What is achieved by this measure is that the object resolution and depth of field of the two beam paths and thus of the images offered to both of the observer's eyes differ. In the observer's brain, the two images are then combined to form an image that is optimized with regard to resolution and depth of field. However, the solution disclosed in the cited document has the disadvantage, in particular, that the observer rapidly tires as a result of the effort required in combining the dissimilar images.

SUMMARY

It is an object of the present disclosure to provide an optical imaging device that is improved in relation to the related art, in particular a digital surgical microscope, and an image generating method, wherein, by comparison with the solutions known from the related art, the generated images can be observed with less effort for a user and have an increased information content.

This object is achieved by an optical imaging device and a method for generating at least one image displayed on an image display unit as described herein.

An optical imaging device according to the disclosure includes at least a first and a second image recording unit for generating a first and a second original image of an object. In this case, the original images differ at least with regard to an image parameter. In this case, the image recording units are arranged in such a way that original images are recorded from the same perspective. Furthermore, the optical imaging device according to an aspect of the disclosure includes an image processing unit for further processing of the original images and an image display unit for reproducing displayed images generated from the processed original images. In this case, the image processing unit is configured to supplement at least one of the two original images by image information from the other original image in order to generate a displayed image.

A method according to an aspect of the disclosure for generating at least one image displayed on an image display unit from at least two original images of an object recorded by two different image recording units is distinguished by the fact that the two original images differ at least with regard to an image parameter. According to an aspect of the disclosure, the at least two original images are recorded from the same perspective, and at least one of the original images is supplemented by image information of the other original image with an image processing unit in order to generate the displayed image.

As already mentioned, the method can be carried out in particular with a digital surgical microscope, for example with a digital stereo surgical microscope.

In this case, it is advantageous if an image registration is performed for both image channels. In this case, an image registration should be understood to mean a method step which ensures that the same image segment is offered to both eyes of an observer, albeit from different perspectives. Such a registration can be effected for example by the identification and subsequent matching of two distinctive image regions. Matching in the present case should be understood to mean a measure with which the two image segments are brought to congruence. An improved visual impression overall can be achieved with the image registration. Brightness matching can likewise be performed for both image channels in order to further improve the visual impression.

BRIEF DESCRIPTION OF THE DRAWINGS

The disclosure will now be described with reference to the drawings wherein:

FIG. 3 shows a flow diagram of a first method for image processing, FIG. 4 shows a flow diagram of a second method for image processing.

DESCRIPTION OF EXEMPLARY EMBODIMENTS

Figure 1:
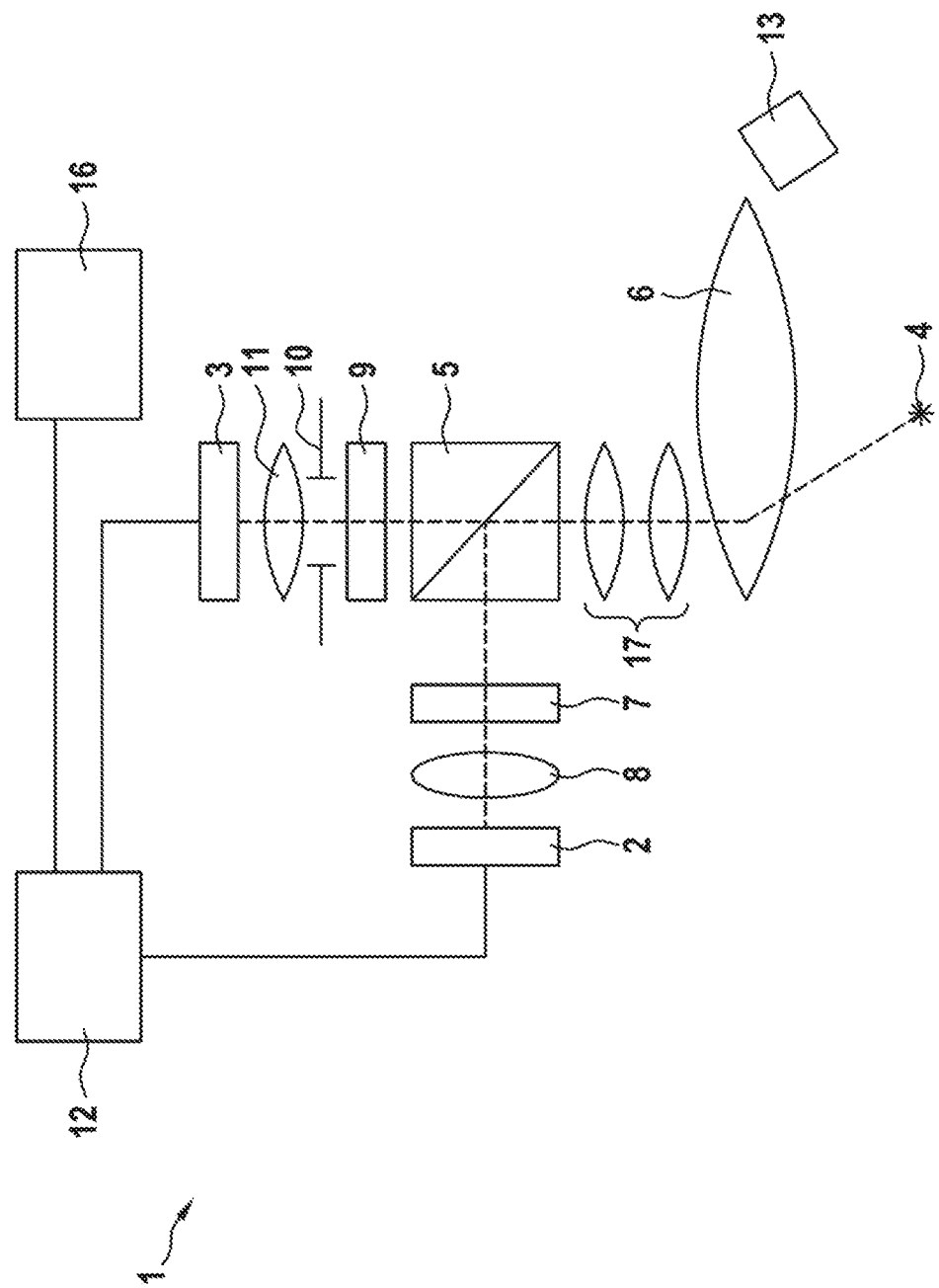
FIG. 1 shows an exemplary digital surgical microscope in a schematic illustration according to an exemplary embodiment of the disclosure.

FIG. 1 illustrates a schematic illustration of an exemplary embodiment of the imaging device 1 according to the disclosure as a digital surgical microscope. The latter can be either, as illustrated, a monoscopic microscope having one observation perspective or a stereoscopic microscope having two observation perspectives. For each observation perspective, the surgical microscope includes a pair of cameras including a color camera 2 and a monochrome camera 3 as image recording units for recording original images of the object 4. The split beam path of the light from the object 4 to the cameras 2 and 3 is realized with a dichroic beam splitter 5. In this case, the beam path passes from the object 4 via a main objective lens 6 into a zoom optical unit 17 and then into the dichroic beam splitter 5. A partial beam is subsequently passed via a video objective lens 8 to the color camera 2. On the other hand, the second partial beam is passed via an adjustable aperture stop 10 and via a video objective lens 11 to the monochrome camera 3. For fluorescence recordings, the digital surgical microscope 1 includes pivotable fluorescence observation filters 7 and 9 between the beam splitter 5 and the video objective lenses 8 and 11. For processing the original images recorded by the two cameras 2 and 3, the digital surgical microscope 1 includes an image processing unit 12 connected to the color camera 2 and the monochrome camera 3, on the one hand, and to the image display unit 16, on the other hand. The object 4 is illuminated with an illumination source 13.

In the exemplary embodiment shown in FIG. 1, the color camera 2 and the monochrome camera 3 are focused onto the same focal plane. The imaging onto the color camera 2 is effected in such a way that the image of the color camera 2 has a high resolution for objects situated in the focal plane. However, this is accompanied by a small depth of field of the images of the color camera 2. The image of the monochrome camera 3 has a high depth of field, but in return a lower resolution of the objects situated in the focal plane.

It is conceivable here that the depth of field of the monochrome camera 3 can be adapted both with the adjustable aperture stop 10 and with the video objective lens 11. The adjustable aperture stop 10 can likewise serve for setting the suitable light transmission during fluorescence recordings. The monochrome camera 3 can include a sensor having lower resolution in comparison with the color camera 2, since there is a low resolution on account of the high depth of field. A low-resolution sensor has an increased light sensitivity, which is advantageous in the case of fluorescence recordings. Consequently, e.g., more light can be passed via the dichroic beam splitter 5 to the color camera 2.

With the image processing unit 12, according to the disclosure, the recorded image of one camera is supplemented by the image information of the other camera, thereby generating a generated overall image having both a high depth of field and a high resolution for each observation perspective.

As a result of the image information of one original image being supplemented by image information from the other original image, it is possible overall to create an improved displayed image. The new image can then have improved properties such as, e.g., a higher dynamic range or less noise.

This type of image conditioning is advantageous particularly for applications in which the optical imaging device is a digital surgical microscope, in particular a stereo surgical microscope. In such cases, by virtue of the fact that a surgeon is supplied with an improved image, safer performance of a possibly complex operation can be achieved. In this case, the inventive solution can be realized in one or both of the stereo channels.

It is advantageous in particular if the image parameter is the depth of field and/or the resolution. In this regard, by way of example, the first image recording unit can be a color camera and the second image recording unit can be a monochrome camera.

In this case, the maximum depth of field of the monochrome camera can be higher than that of the color camera and the maximum resolution of the color camera can be higher than that of the monochrome camera.

As already mentioned, both cameras capture the object such as, for example, an operation scene from at least approximately the same perspective. The image is subsequently conditioned with the image processing unit and displayed to the observer on a monoscopic or stereoscopic digital display unit. In this case, the maximum object resolution in the displayed image for objects in and near the focal plane can correspond almost or completely to that of the original image captured by the color camera. In any case the maximum object resolution in the displayed image is higher than the maximum object resolution of the images captured by the monochrome camera for objects in and near the focal plane. Objects lying outside the depth of field range of the color camera can have in the displayed image an object resolution corresponding almost or completely to the object resolution in the original image captured by the monochrome camera. In any case the maximum object resolution for objects outside the focal plane in the displayed image is higher than the maximum object resolution of the images captured by the color camera. In this case, it is advantageous if both image recording units are focused onto the same focal plane.

Likewise, the maximum depth of field of the color camera can be higher than that of the monochrome camera and the maximum resolution of the monochrome camera is larger than that of the color camera.

In particular, both image recording units can also be color cameras.

According to an aspect of the disclosure, a beam splitter is arranged in the light path between the object and the image recording units. In this case, the beam splitter ensures that both image recording units are offered exactly the same perspective of the object. Its characteristic curve can have, in particular, the smoothest possible spectral transmission profile different from zero in the visible spectral range, such that the visible light is recorded with a defined splitting ratio by both image recording units.

In particular, the beam splitter can be a dichroic beam splitter.

In one exemplary embodiment of the disclosure, an aperture stop can be arranged upstream of one of the image recording units. In this regard, it is possible to employ an adjustable aperture stop, for example, which can typically set in a variable manner the depth of field of the image recorded by the monochrome camera. Optionally, further stops can also be used, such as an additional stop upstream of the color camera, for example. An adjustable stop is advantageous for fluorescence recordings, in particular, because the stop can then be opened in order that more fluorescent light reaches the monochrome camera.

For changing the depth of field, a lens of an image recording unit, for example of a monochrome camera, can likewise be configured such that the depth of field of the imaging is increased.

Figure 2:
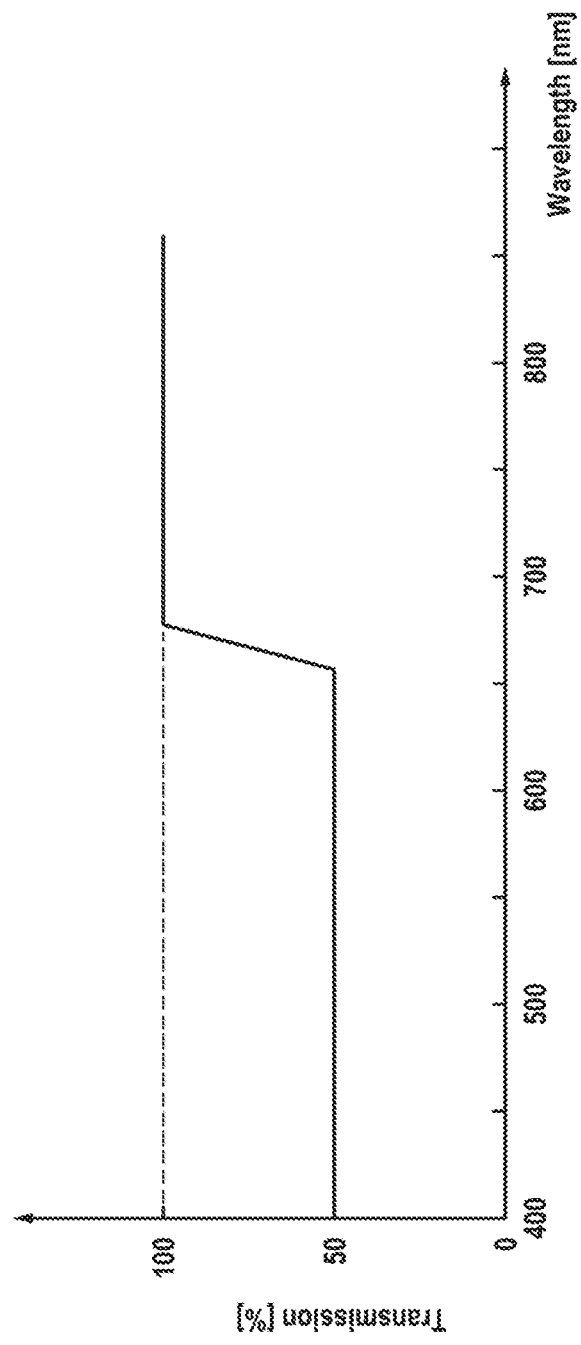
FIG. 2 shows the characteristic curve of a dichroic beam splitter according to an exemplary embodiment of the disclosure.

FIG. 2 shows the characteristic curve of a dichroic beam splitter 5 according to an exemplary embodiment. In the visible spectral range, the dichroic beam splitter 5 has a smooth transmission profile with a constant degree of transmission, such that the visible light is passed with a defined splitting ratio to the color camera 2 and also to the monochrome camera 3. The dichroic beam splitter 5 has a high degree of transmission for light in the near infrared (700 to 850 nm). It is also conceivable for the light in the near infrared wavelength range to be detected by the monochrome camera in addition to the light in the visible wavelength range.

FIG. 3 shows a flow diagram of a local comparison algorithm 14 such as can be implemented by the image processing unit 12. In this case, the image F corresponds to the recorded original image of the color camera 2 and the original image M corresponds to the recorded image of the monochrome camera 3. The local contrast and the local image sharpness of image F and image M are determined by a customary image sharpness algorithm. A local comparison of the contrast and the image sharpness is carried out for each image region of image M and image F. The displayed image D1 is subsequently composed in such a way that at each image region of D1 the corresponding image region from image F or image M having the higher sharpness or the higher contrast is taken, the color information being adopted from image F. It is conceivable for the generated color image D1 to be digitally resharpened in the case of higher-resolution greyscale information from image M. A mixture of the two sources image M and image F is typically used in transition regions. The method finds application for example only in the luminance or luma channel ("Y") of the color image F in the YCbCr format, while the chrominance component ("CbCr") of the color image F is adopted in F' without being changed (or after having been digitally resharpened on the basis of the luminance channel). For luminance-chrominance color models different from YcbCr, the method is likewise typically carried out separately according to luminance and chrominance channels. Other color models from the related art can likewise be used with suitable differentiation between greyscale and color information.

The displayed image need not necessarily be a color image. Alternatively or additionally, it is also possible to calculate a new monochrome image as the displayed image, which likewise has a combination of high depth of field and high maximum object resolution of objects in the focal plane.

Furthermore, a color image can be composed as the displayed image in such a way that in regions outside the depth of field range of the original color image it gradually transitions to a monochrome image, for example to a greyscale image. Blurred color or chrominance information on a finely structured brightness value or luminance pattern is avoided as a result.

Furthermore, the first image recording unit can record a monochrome image with a smaller optical imaging scale than the color image recorded by the second image recording unit. In this case, the recorded monochrome image is firstly digitally zoomed and suitably interpolated, such that the preprocessed monochrome image shows the same object segment as the color image.

Alternatively or additionally, the first image recording unit embodied as a monochrome camera can have a smaller number of pixels than the color camera. In this case, the monochrome image is firstly scaled up/interpolated to the number of pixels of the color image. In principle, that image recording unit which records the image with the higher depth of field can have a smaller number of pixels.

FIG. 4 shows a flow diagram of an alternative image processing method, in which a depth map algorithm 15 is employed in the image processing unit 12. In this case, a depth map that was created with a depth sensor is used for data processing. It is conceivable, in the case of a stereoscopic surgical microscope, for a depth map to be obtained by way of stereo reconstruction. By way of the known depth from the depth map of the respective image region, a decision is taken as to whether image M or image F has locally the higher depth of field or object resolution. For the displayed image D2, that image region which has a higher depth of field or resolution is selected for each image region. The color information of the displayed image D2 is adopted from image F. Optionally, a suitable mixed weighting of image F and image M can be performed in transition regions.

Figure 5:
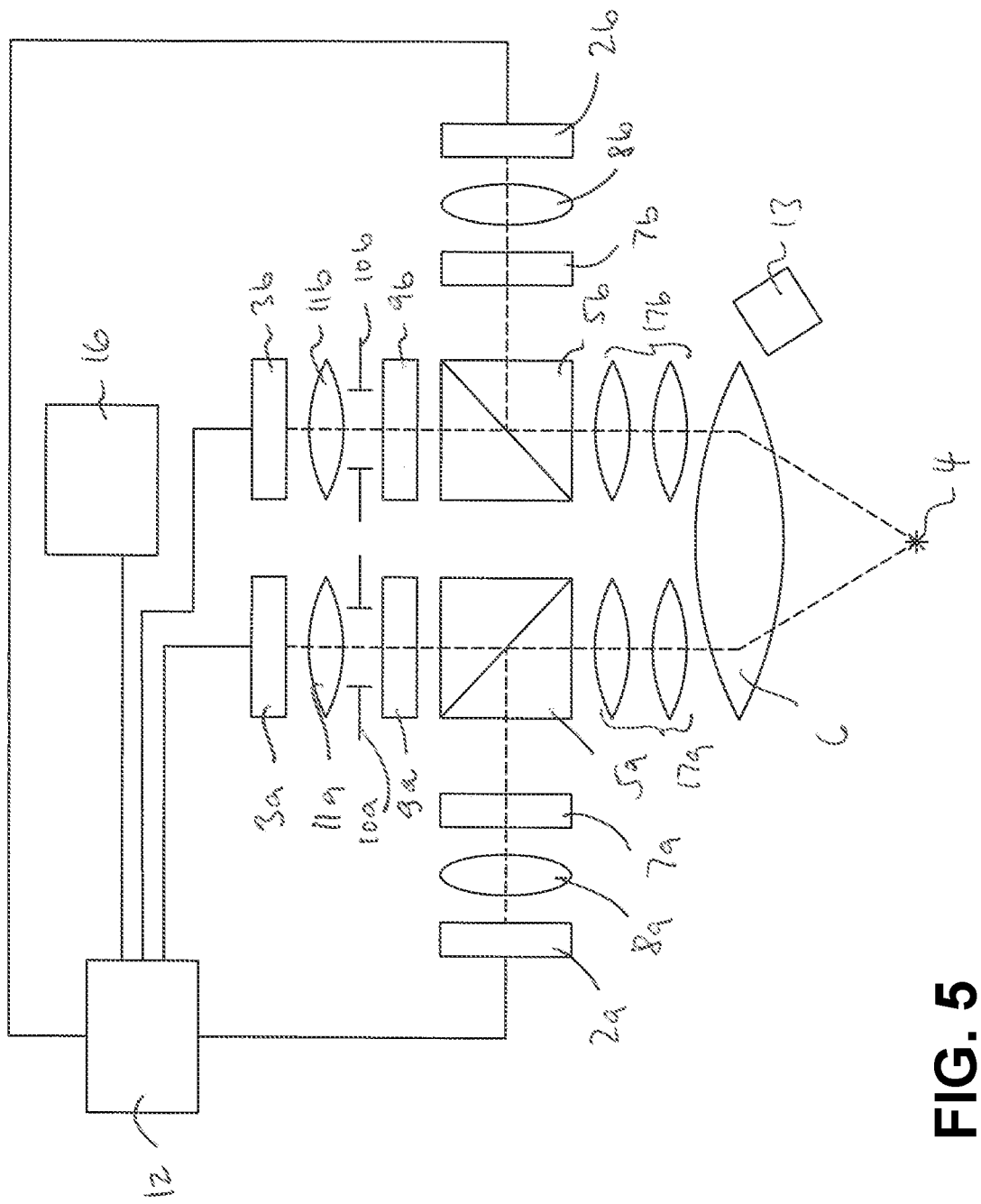
FIG. 5 shows an exemplary digital surgical microscope with stereo channels in a schematic illustration according to an exemplary embodiment of the disclosure.

FIG. 5 illustrates a schematic illustration of an exemplary embodiment of the imaging device 1 according to the disclosure as a digital surgical microscope in which the inventive solution is realized in both of the two stereo channels. For each of the two stereo channels, the surgical microscope includes a pair of cameras including a color camera 2a, 2b and a monochrome camera 3a, 3b as image recording units for recording original images of the object 4. The split beam path of the light from the object 4 to the cameras 2a, 2b and 3a, 3b is realized with dichroic beam splitters 5a, 5b, respectively. In this case, two beam paths pass from the object 4 via a main objective lens 6 into zoom optical units 17a, 17b and then into the dichroic beam splitters 5a, 5b, respectively. Partial beams are subsequently passed via video objective lenses 8a, 8b to the color cameras 2a, 2b. On the other hand, second partial beams are passed via adjustable aperture stops 10a, 10b and via video objective lenses 11a, 11b to the monochrome cameras 3a, 3b. For fluorescence recordings, the digital surgical microscope 1 includes pivotable fluorescence observation filters 7a, 7b and 9a, 9b between the beam splitters 5a, 5b and the video objective lenses 8a, 8b and 11a, 11b. For processing the original images recorded by the cameras 2a, 2b and 3a, 3b, the digital surgical microscope 1 includes an image processing unit 12 connected to the color cameras 2a, 2b and the monochrome cameras 3a, 3b, on the one hand, and to the image display unit 16, on the other hand. The object 4 is illuminated with an illumination source 13.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Imaging device
2, 2a, 2b Color camera
3, 3a, 3b Monochrome camera
4 Object
5, 5a, 5b Beam splitter
6 Main objective lens
7, 7a, 7b Fluorescence observation filter
8, 8a, 8b Video objective lens
9, 9a, 9b Fluorescence observation filter
10, 10a, 10b Aperture stop
11, 11a, 11b Video objective lens
12 Image processing unit
13 Illumination source
14 Local comparison algorithm
15 Depth map algorithm
16 Image display unit
17, 17a, 17b Zoom optical unit
F Color image
M Monochrome image
D1 Displayed image
D2 Displayed image

What is claimed is:

1. An optical imaging device, comprising:
a first camera configured to generate a first original image of an object;

a second camera configured to generate a second original image of the object;

a beam splitter arranged in a light path of a single channel of the optical imaging device between the object and the first camera and the second camera, wherein the first and second original images differ from one another at least with regard to a depth of field or a resolution, and wherein the first and second cameras are arranged such that the first and second original images are recorded from light originating from the light path between the object and the beam splitter;

a controller configured to:

process the first and second original images, and supplement portions of at least one of the first and second original images with portions from another one of the first and second original images to generate a displayed image; and a display configured to reproduce displayed images generated from the first and second original images processed by the controller.

2. The optical imaging device according to claim 1, wherein the optical imaging device is a digital surgical microscope.

3. The optical imaging device according to claim 1, wherein the first camera is a color camera and the second camera is a monochrome camera.

4. The optical imaging device according to claim 3, wherein a maximum depth of field of the monochrome camera is higher than a maximum depth of field of the color camera.

5. The optical imaging device according to claim 3, wherein a maximum resolution of the color camera is higher than a maximum resolution of the monochrome camera.

6. The optical imaging device according to claim 3, wherein a maximum depth of field of the color camera is higher than a maximum depth of field of the monochrome camera.

7. The optical imaging device according to claim 3, wherein a maximum resolution of the monochrome camera is larger than a maximum resolution of the color camera.

8. The optical imaging device according to claim 1, wherein both the first camera and the second camera are color cameras.

9. The optical imaging device according to claim 1, wherein the beam splitter is a dichroic beam splitter.

10. The optical imaging device according to claim 1, further comprising:

an aperture stop arranged upstream of one of the first camera and the second camera.

11. The optical imaging device according to claim 10, wherein the aperture stop is adjustable.

12. The optical imaging device according to claim 1, wherein the optical imaging device is a stereo surgical microscope and the first camera and the second camera, the controller, and the display are provided for at least one of two stereo channels.

13. The optical imaging device according to claim 12, wherein the first camera and the second camera, the controller, and the display are provided for both of two stereo channels.

14. The optical imaging device according to claim 1, wherein the first and second original images are recorded from a same observation perspective of the object.

15. A method for generating at least one image, displayed on a display, from at least two original images of an object recorded by two different cameras, wherein the at least two original images differ from one another at least with regard to a depth of field or a resolution, the method comprising:

arranging a beam splitter in a light path of a single channel of an optical imaging device between the object and the two different cameras;

recording the at least two original images from light originating from the light path between the object and the beam splitter, and supplementing portions of at least one of the at least two original images with portions from another one of the at least two original images by a controller to generate the at least one image.

16. The method according to claim 15, wherein the method is carried out with a digital surgical microscope.

17. The method according to claim 15, wherein a first image of the at least two original images is a monochrome image and a second image of the at least two original images is a color image.

18. The method according to claim 17, wherein the monochrome image has a higher depth of field than the color image.

19. The method according to claim 15, wherein each of the at least two original images is a monochrome image.

20. The method according to claim 15, wherein each of the at least two original images is a color image.

21. The method according to claim 15, further comprising:

carrying out the method with a stereo surgical microscope; and performing an image registration for both of two stereo channels.

22. The method according to claim 15, further comprising:

carrying out the method with a stereo surgical microscope; and performing a brightness matching for both of two stereo channels.

23. The method according to claim 15, wherein the at least two original images are recorded from a same observation perspective of the object.

* * * * *